United States Patent
Lee et al.

(10) Patent No.: US 8,406,011 B2
(45) Date of Patent: Mar. 26, 2013

(54) ELECTRONIC DEVICE WITH SUPPORTING APPARATUS

(75) Inventors: Guang-Yao Lee, New Taipei (TW); Yi-Sheng Lin, New Taipei (TW); Bin Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 94 days.

(21) Appl. No.: 13/198,730

(22) Filed: Aug. 5, 2011

(65) Prior Publication Data
US 2012/0224350 A1    Sep. 6, 2012

(30) Foreign Application Priority Data
Mar. 4, 2011 (CN) .......................... 2011 1 0051788

(51) Int. Cl.
H05K 7/02 (2006.01)
(52) U.S. Cl. .............. 361/810; 361/679.01; 361/679.02; 361/807; 361/679.39; 361/679.44
(58) Field of Classification Search ............. 361/679.01, 361/679.02, 679.21, 679.22, 679.39, 679.43, 361/679.44, 679.58, 807, 810, 825; 248/157, 248/161, 125.1, 200, 429, 425, 675
See application file for complete search history.

(56) References Cited

U.S. PATENT DOCUMENTS

| | | | | |
|---|---|---|---|---|
| 7,694,929 B2* | 4/2010 | Jang | ............................ | 248/372.1 |
| 8,144,452 B2* | 3/2012 | Huang et al. | ............. | 361/679.02 |
| 8,313,074 B2* | 11/2012 | Wang | ........................ | 248/295.11 |
| 2010/0214729 A1* | 8/2010 | Dittmer et al. | ........... | 361/679.01 |
| 2011/0058322 A1* | 3/2011 | Lee et al. | .................. | 361/679.01 |

* cited by examiner

Primary Examiner — Tuan T Dinh
Assistant Examiner — Hung Dang
(74) Attorney, Agent, or Firm — Altis Law Group, Inc.

(57) ABSTRACT

A support for an electronic device includes a mounting apparatus and a supporting apparatus. The mounting apparatus includes a fixing bracket mounted to the main body of an electronic device, an engaging member slidably mounted to the fixing bracket, and a resilient member connected between the fixing bracket and the engaging member. The supporting apparatus includes a connecting bracket detachably mounted to the fixing bracket. When the engaging member is slid relative to the fixing bracket, a stop piece moves away from the connecting hole, and a hook extends through the connecting hole. After the engaging member is released the stop piece moves to the connecting hole to engage with the hook.

12 Claims, 9 Drawing Sheets

ELECTRONIC DEVICE WITH SUPPORTING APPARATUS

BACKGROUND

1. Technical Field

The present disclosure relates to electronic devices, and particularly, to an electronic device having a supporting apparatus.

2. Description of Related Art

An electronic device, such as an all-in-one computer or a liquid crystal display, is often secured to a supporting mechanism by a plurality of fasteners or screws. However, it is time-consuming and often difficult to disassemble the supporting mechanism from the electronic device when the electronic device needs to be hung on a wall.

BRIEF DESCRIPTION OF THE DRAWINGS

The components of the drawings are not necessarily drawn to scale, the emphasis instead being placed upon clearly illustrating the principles of the embodiments. Moreover, in the drawings, like reference numerals designate corresponding parts throughout several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
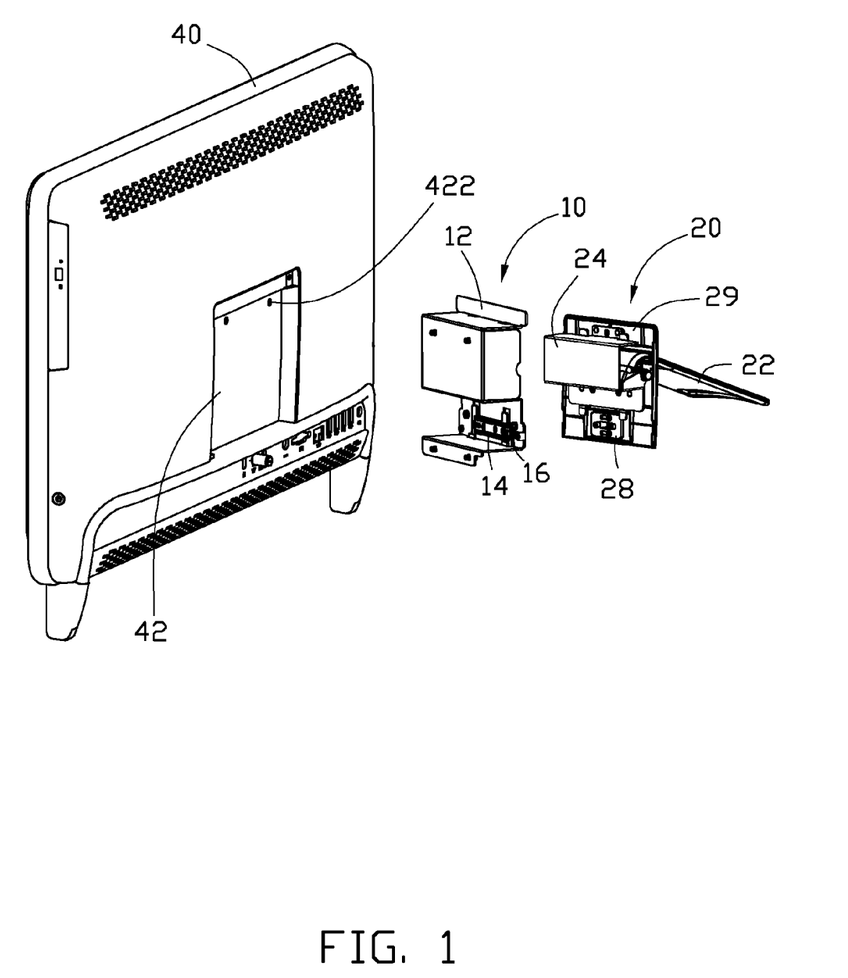
FIG. 1 is an exploded, isometric view of an exemplary embodiment of an electronic device, the electronic device includes a mounting apparatus and a supporting apparatus.

Referring to FIG. 1, an embodiment of an electronic device includes a main body 40, a mounting apparatus 10 fixed to the main body 40, and a supporting apparatus 20 detachably latched to the mounting apparatus 10. A rectangular recess 42 is defined in a rear side of the main body 40. Four screw holes 422 are defined in the base of the recess 42. In the embodiment, the main body 40 is part of an all-in-one computer.

Figure 2:
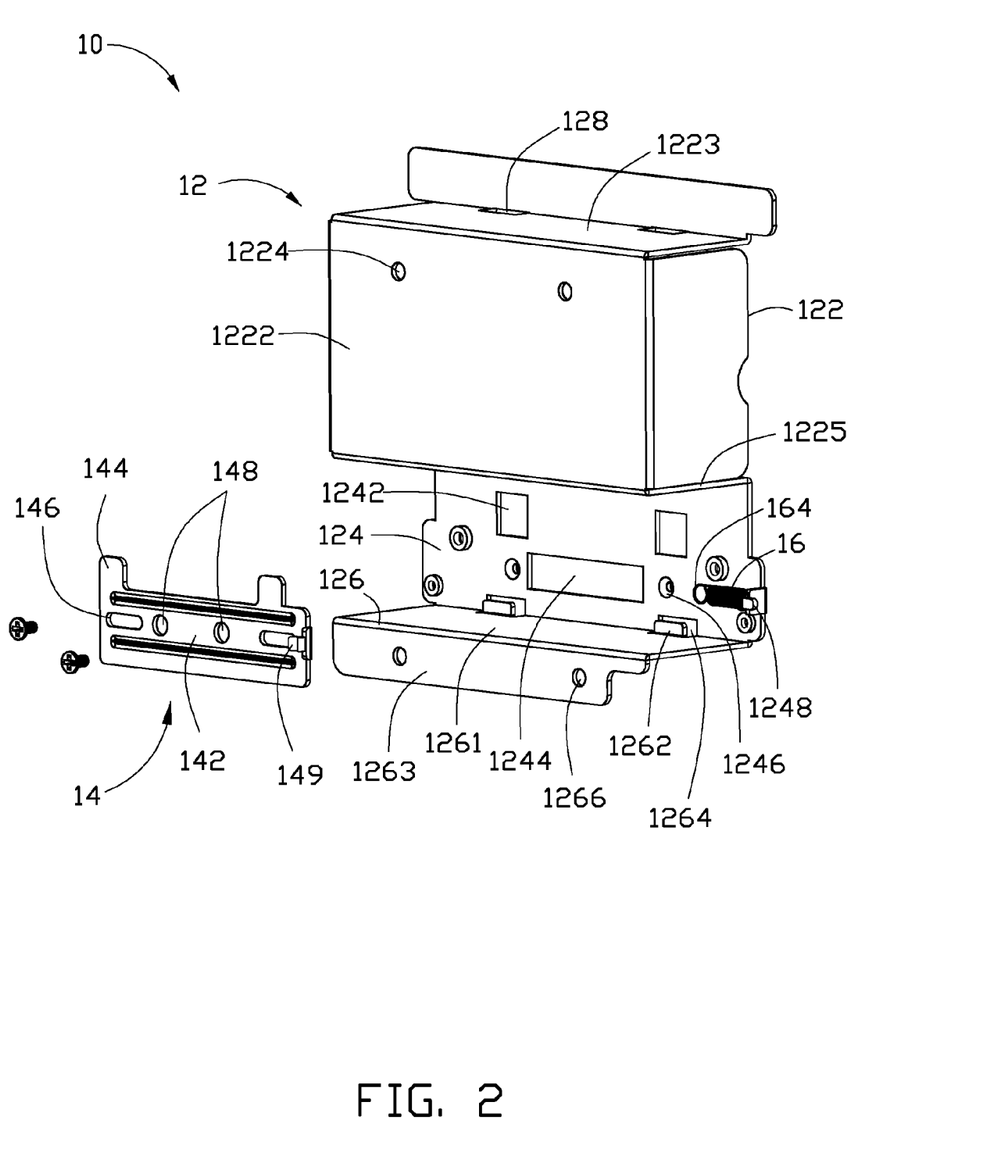
FIG. 2 is an exploded, enlarged, isometric view of the mounting apparatus of FIG. 1.

Referring to FIG. 2, the mounting apparatus 10 includes a fixing bracket 12, an engaging member 14, and a resilient member 16.

The fixing bracket 12 includes a frame 122 with a rectangular box-shape. The frame 122 defines an opening in a rear side. The frame 122 includes a rectangular front wall 1222 opposite to the opening, a top wall 1223 perpendicularly extending rearward from the top of the front wall 1222, and a bottom wall 1225 perpendicularly extending rearward from the bottom of the front wall 1222. The front wall 1222, the top wall 1223, and the bottom wall 1225 cooperatively form a receiving space 1226 (shown in FIG. 4). Two fastening holes 1224 are defined in the front wall 1222, adjacent to the top wall 1223. A mounting panel 124 perpendicularly extends down from the rear side of the bottom wall 1225. An elongate through slot 1244 is defined in the mounting panel 124, in a lower portion of the mounting panel 124, the longitudinal direction of the through slot 1244 is parallel to the bottom wall 1225. Two connecting holes 1242 are defined in the mounting panel 124, above the through slot 1244. Two screw holes 1246 are defined in the mounting panel 124, at opposite ends of the through slot 1244, respectively. A hook 1248 extends from an end of the mounting panel 124, aligning with the screw holes 1246. An L-shaped fixing portion 126 extends from the bottom of the mounting panel 124. The fixing portion 126 includes a rectangular supporting plate 1261 perpendicularly extending forward from the bottom of the mounting panel 124, and an extension plate 1263 perpendicularly extending down from the front side of the supporting plate 1261. Two tabs 1262 protrude up from the supporting plate 1261, adjacent to the mounting panel 124. The tabs 1262 and the mounting panel 124 cooperatively form a slide slot 1264, the extension direction of the slide slot 1264 is parallel to the longitudinal direction of the through slot 1244. Two fastening holes 1266 are defined in the extension plate 1263. Two latching holes 128 are defined in the rear side of the top wall 1223.

The engaging member 14 includes a rectangular sliding panel 142. Two stop pieces 144 extend up from a top of the sliding panel 142. Two elongated and longitudinally-aligned guide holes 146 are defined in the sliding panel 142, each being at opposite ends of the sliding panel 142. Two positioning holes 148 are defined in the sliding panel 142, between the guide holes 146. A hook 149 extends from one end of the sliding panel 142, in alignment with the longitudinal centerline of the guide holes 146.

In the embodiment, the resilient member 16 is a spring, with two grommets 164 extending from two opposite ends of the spring.

Figure 3:
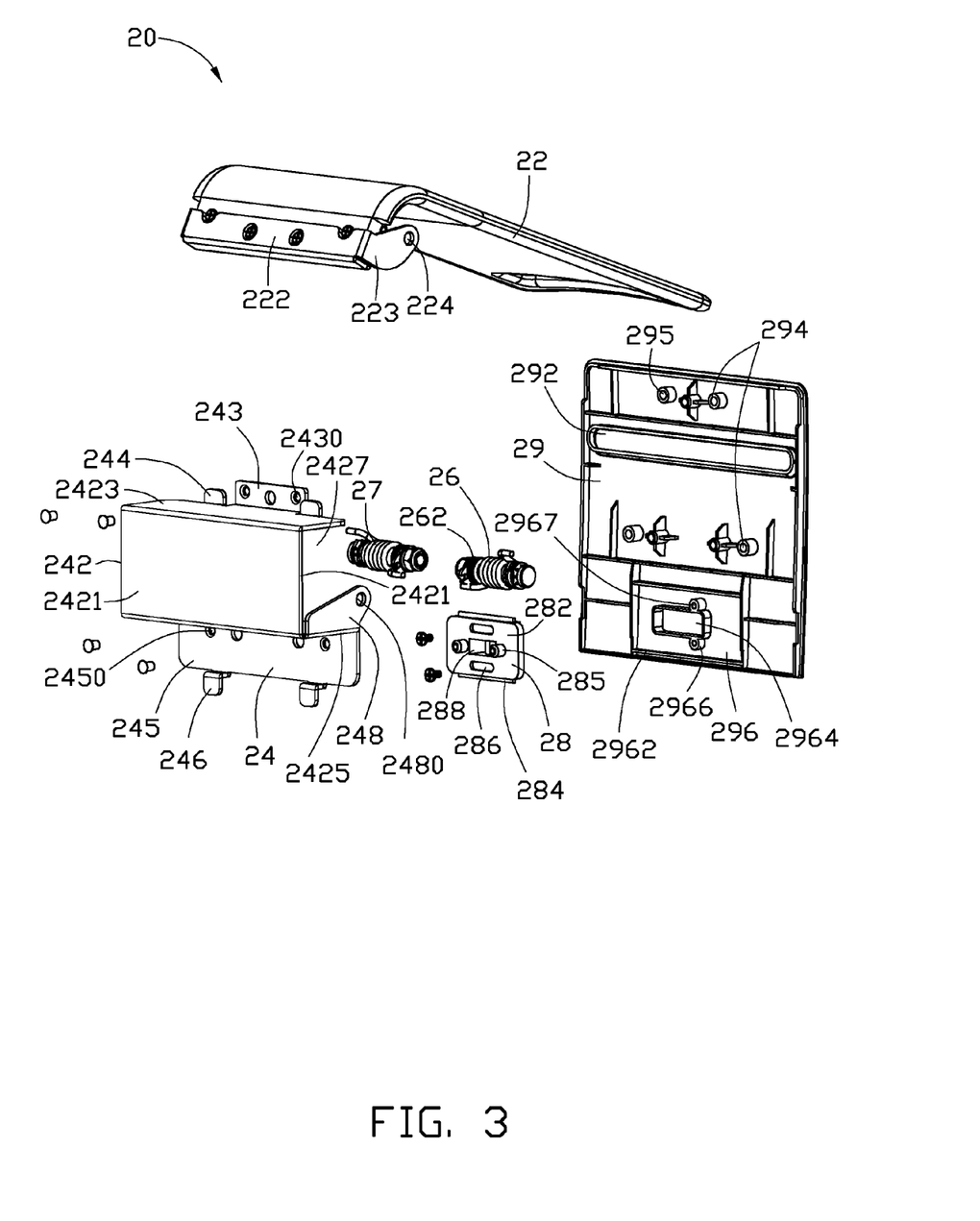
FIG. 3 is an exploded, enlarged, isometric view of the supporting apparatus of FIG. 1.

Referring to FIG. 3, the supporting apparatus 20 includes a supporting bracket 22, a connecting bracket 24, two shaft members 26, an operation member 28, and a cover 29.

The supporting bracket 22 is substantially L-shaped, with a connecting portion 222 extending from a first end of the supporting bracket 22. Two pivoting plates 223 respectively extend from two opposite ends of the connecting portion 222. A shaft hole 224 is defined in each pivoting plate 223.

The connecting bracket 24 includes a substantially U-shaped receiving portion 242. The receiving portion 242 includes a rectangular front wall 2421, a top wall 2423 perpendicularly extending rearward from the top of the front wall 2421, and a bottom wall 2425 perpendicularly extending rearward from the bottom of the front wall 2421. The front wall 2421, the top wall 2423, and the bottom wall 2425 cooperatively form a receiving space 2427 for receiving the connecting portion 222 of the supporting bracket 22. A first fixing plate 243 perpendicularly extends up from the middle of the rear side of the top wall 2423, and defines two fixing holes 2430 therein. Two protrusions 244 protrude up from the rear side of the top wall 2423, substantially at each end of the first fixing plate 243. A second fixing plate 245 perpendicularly extends down from the rear side of the bottom wall 2425. Two fixing holes 2450 are defined in the second fixing plate 245. Two L-shaped hooks 246 extend down from the bottom side of the second fixing plate 245, opposite to the front wall 2421. Two connecting plates 248 extend up from two opposite ends of the bottom wall 2425, respectively. Each connecting plate 248 defines a shaft hole 2480 therein.

Each shaft member 26 includes a shaft 262 and a torsion spring 27 fitting about the shaft 262.

The operation member 28 includes a substantially rectangular sliding plate 282. Two sliding rails 284 protrude out from the two opposite sides of the sliding plate 282. Two columns 285 protrude forward from the middle of the sliding plate 282. Two long guide holes 286 are defined in the sliding plate 282, above and below and between the columns 285. The longitudinal direction of each guide hole 286 is parallel to the extension direction of the sliding rails 284. An operation portion 288 protrudes rearward from the sliding plate 282, between the columns 285.

The cover 29 is substantially rectangular, and defines an elongated opening 292 in the upper portion of the cover 29. Four columns 294 protrude from the front surface of the cover 29, above and below the opening 292, respectively. A screw hole 295 is axially defined in each column 294. A recess 296 is defined in a lower portion of the front surface of the cover 29, for receiving the operation member 28. Two parallel slide slots 2962 are defined in the cover 29, respectively above and below the recess 296. A long guide hole 2964 is defined in the recess 296, parallel to the slide slots 2962. Two columns 2966 protrude from the recess 296, respectively above and below the guide hole 2694. A screw hole 2967 is axially defined in each column 2966.

Figure 4:
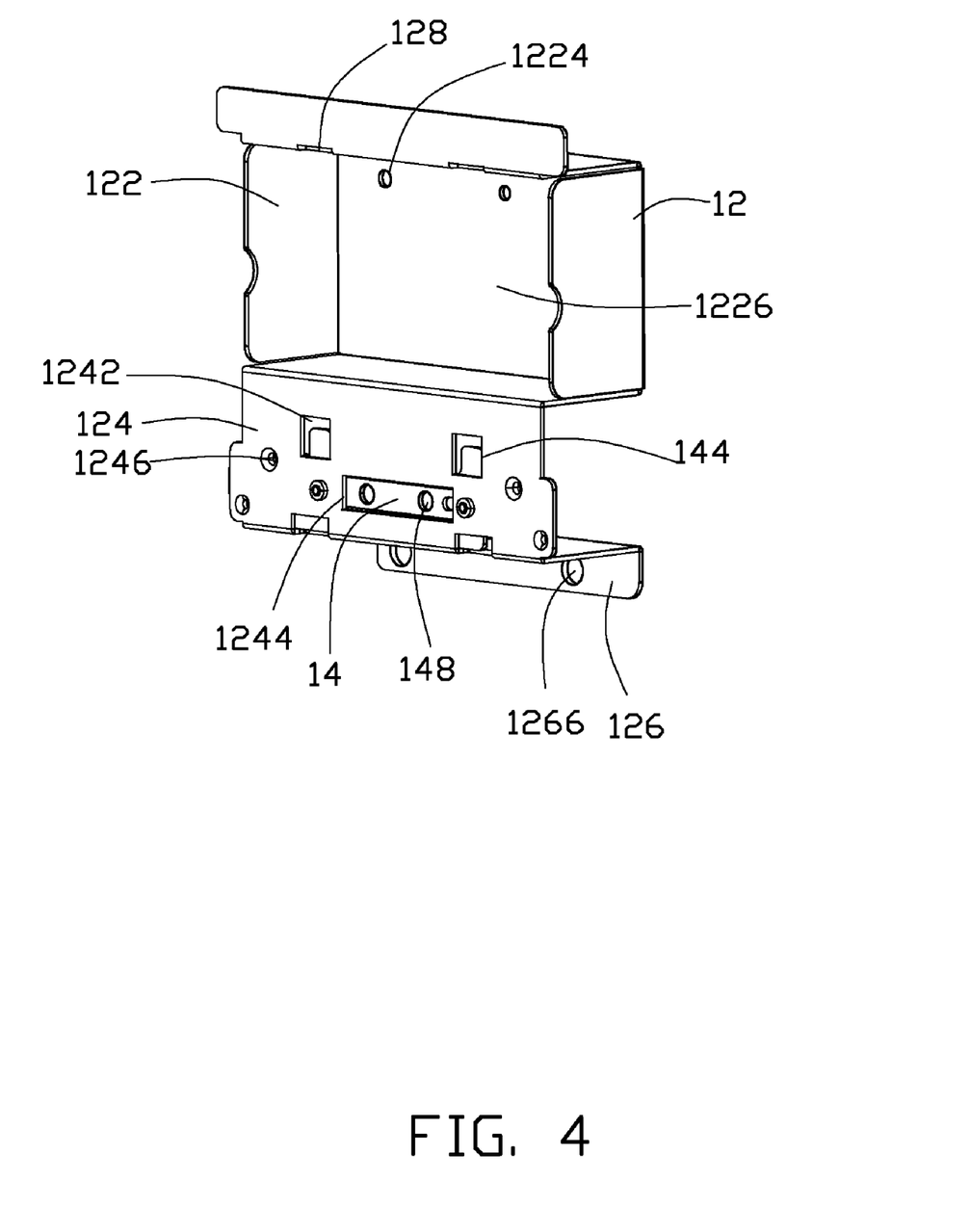
FIG. 4 is an assembled, isometric view of the mounting apparatus of FIG. 2, but viewed from another perspective.

Referring to FIG. 2 and FIG. 4, in assembly of the mounting apparatus 10, the engaging member 14 is attached to the front surface of the mounting panel 124. The bottom side of the engaging member 14 is slidably received in the slide slot 1264. The resilient member 16 is connected between the hooks 1248 and 149 and the grommets 164 are respectively latched to the hooks 149 and 1248. Two screws slidably extend through the guide holes 146, to be screwed into the corresponding screw holes 1246. The engaging member 14 is then slidably mounted to the fixing bracket 12. The stop pieces 144 align with the connecting holes 1242. The positioning holes 148 align with the through slot 1244.

Figure 9:
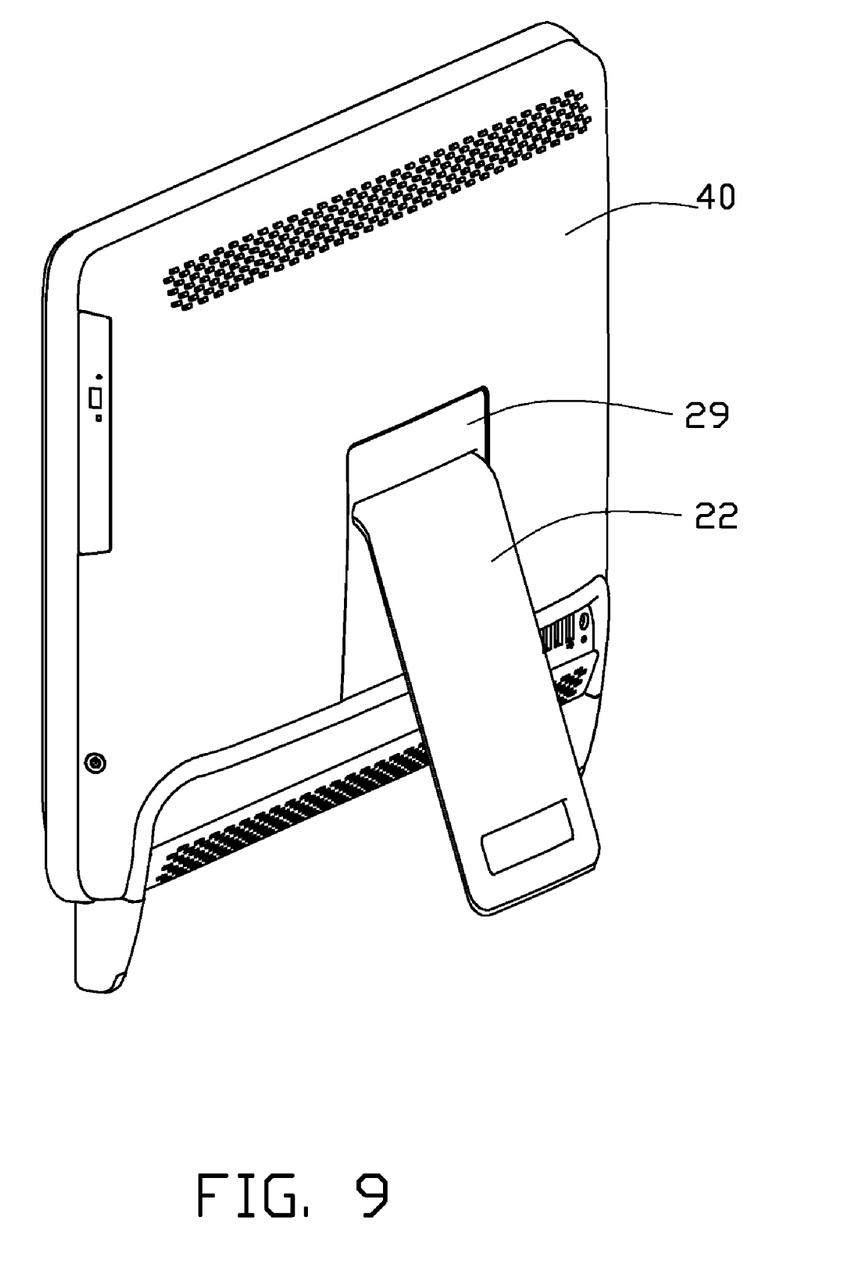

Referring to FIG. 1 and FIG. 9, in assembly of the mounting apparatus 10 to the main body 40, the front wall 1222 is received in the recess 42. Four screws extend through the fastening holes 1224 and 1266, to be screwed into the corresponding screw holes 422.

Figure 5:
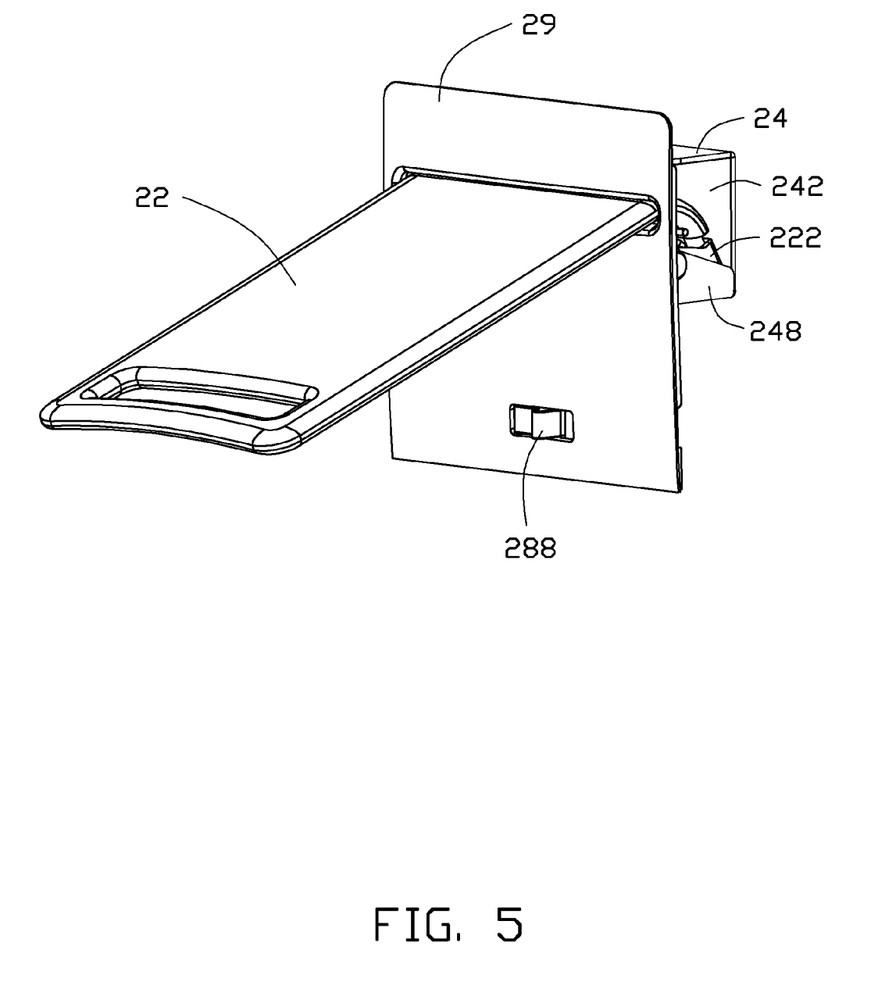
FIG. 5 is an assembled, isometric view of the supporting apparatus of FIG. 3, but viewed from yet another perspective.
Figure 6:
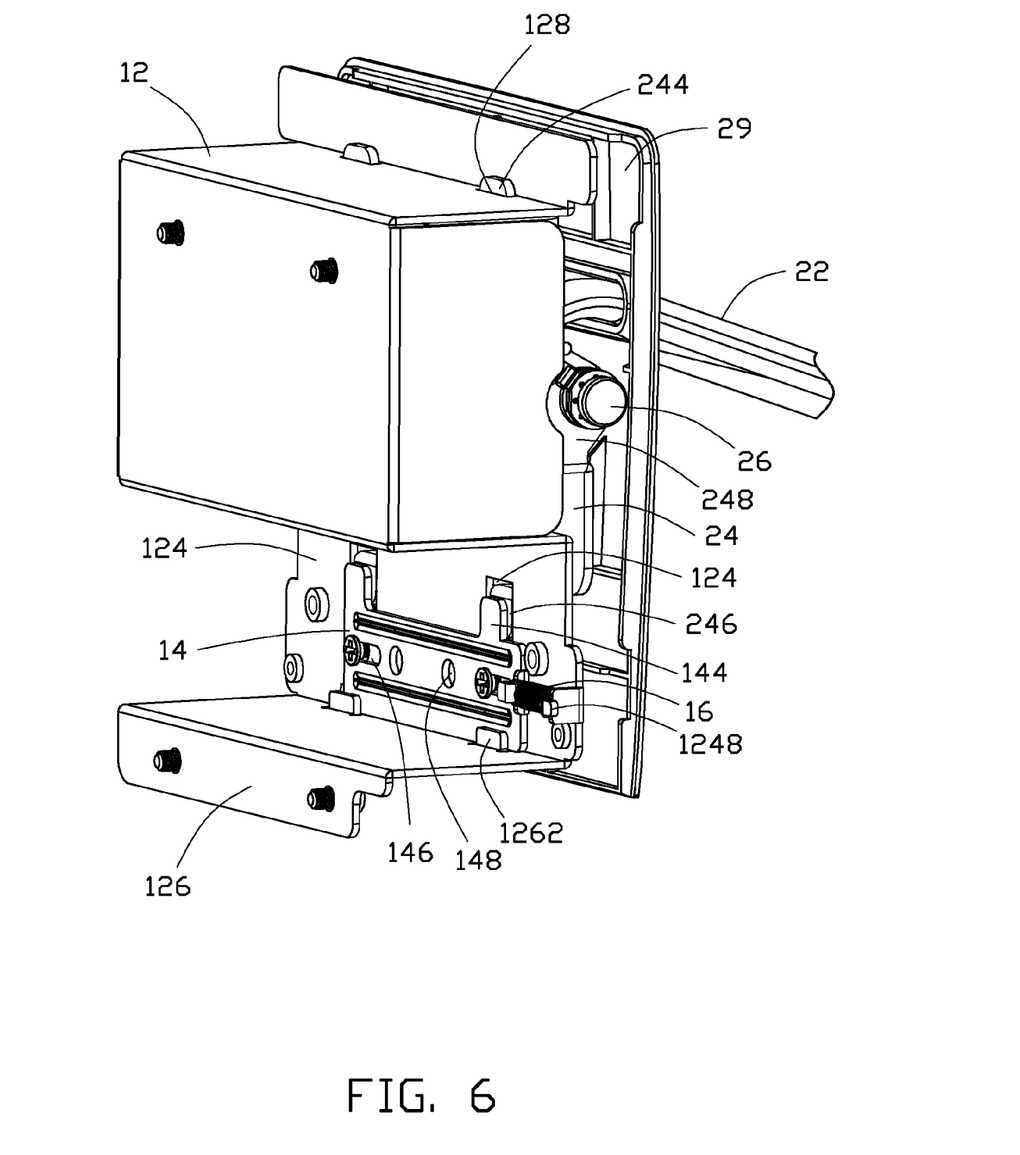
FIGS. 6-9 are isometric views of the process of assembling the supporting apparatus of the electronic device of FIG. 1.
Figure 7:
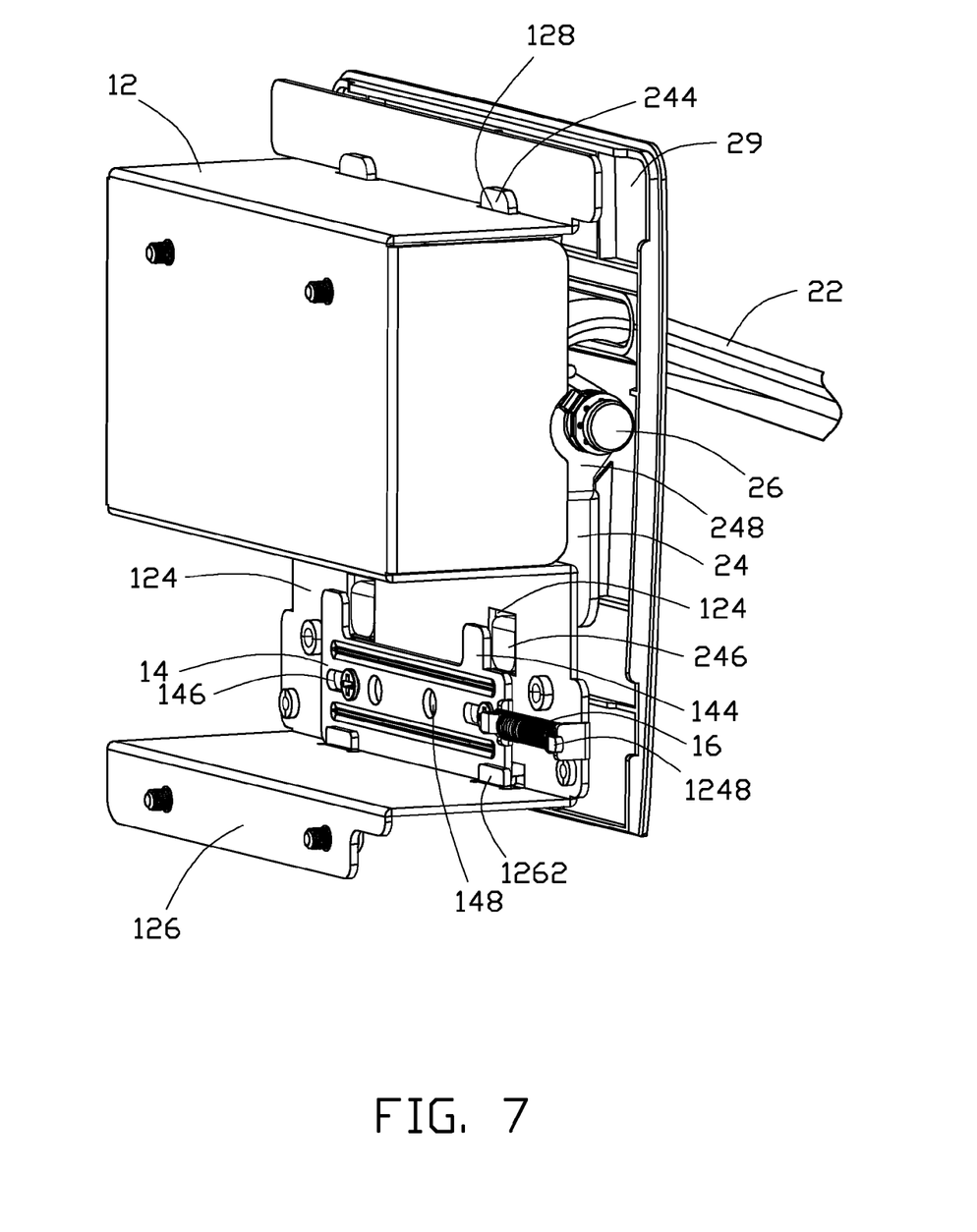
Figure 8:
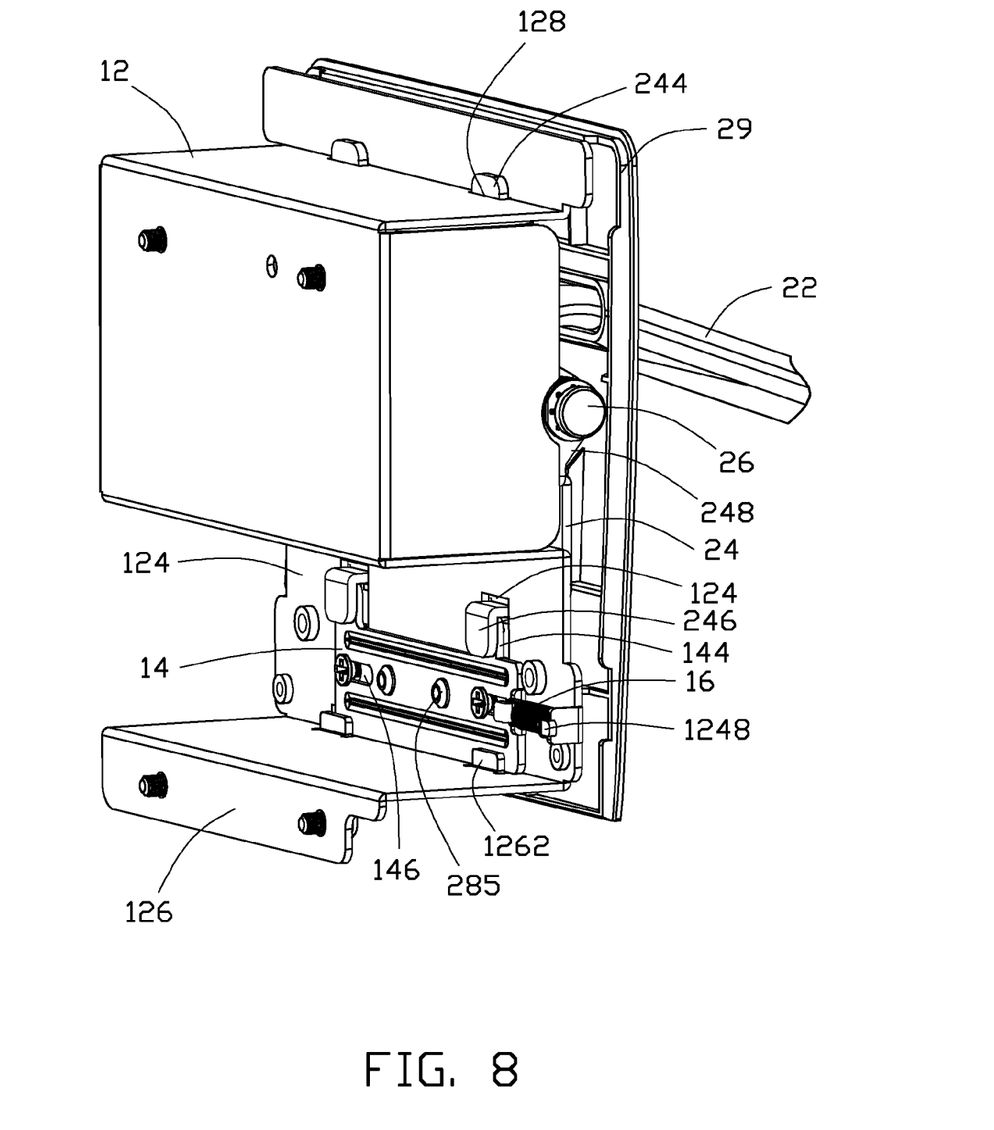

Referring to FIG. 3 and FIG. 5, in the assembly of the supporting apparatus 20, the connecting portion 222 is received in the receiving space 2427 of the receiving portion 242 of the connecting bracket 24. The pivoting plates 223 are attached to the inner surfaces of the connecting plates 248, respectively. The shafts 262 of the shaft member 26 pivotably extend through the shaft holes 2480 and 224. The two fingers of each torsion spring 27 resist against the corresponding connecting plate 248 and the connecting portion 222, respectively. Therefore, the supporting bracket 22 is pivotably mounted to the connecting bracket 24. The second end of the supporting bracket 22 opposite to the connecting portion 222 extends through the opening 292 of the cover 29. Four fasteners extend through the fixing holes 2430 and 2450, to be screwed into the screw holes 295 of the columns 294. The connecting bracket 24 is fixed to the front surface of the cover 29. The operation member 28 is received in the recess 296. The operation portion 288 extends through the guide hole 2964. The slide rails 284 are slidably received in the corresponding slide slots 2962. Two fasteners slidably extend through the guide holes 286, to be screwed into the corresponding screw holes 2967 of the columns 2966. The operation member 28 is slidably mounted to the cover 29.

Referring to FIGS. 6-9, in the assembly of the supporting apparatus 20 to the mounting apparatus 10, the receiving portion 242 is received in the receiving space 1226. The protrusions 244 of the connecting bracket 24 are latched in the latching holes 128 of the fixing bracket 12. The columns 285 of the operation member 28 extend through the through slots 1244, to engage in the positioning holes 148. In pressing the operation portion 288 to move the operation member 28, the engaging member 14 is moved away from the hook 1248 and deforms the resilient member 16. The stop pieces 144 are moved away from the corresponding connecting holes 1242. The hooks 246 extend through the corresponding connecting holes 1242. In releasing the operation portion 288, the resilient member 16 biases the engaging member 14 to move toward the hook 1248 in releasing its own tension. The stop pieces 144 move between the hooks 246 and the connecting holes 1242 to be blocked by the hooks 246. The supporting apparatus 20 is then assembled to the main body 40 through the mounting apparatus 10 and the supporting bracket 22 thus supports the main body 40.

When disassembling the supporting apparatus 20, the operation portion 288 is pushed to force the engaging member 14 to move away from the hook 1248, and the resilient member 16 is deformed. When the stop pieces 144 is disengaged from the hooks 246, the supporting apparatus 20 moves away from the mounting apparatus 10, to allow the protrusions 244 to disengage from the latching holes 128. The main body 40 can still be hung on a wall through the fixing bracket 12 of the mounting apparatus 10, simply by removing the supporting apparatus 20.

Even though numerous characteristics and advantages of the embodiment(s) have been set forth in the foregoing description, together with details of the structures and functions of the embodiment(s), the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. An electronic device, comprising:
a main body;
a mounting apparatus to hung the main body to a wall, the mounting apparatus comprising a fixing bracket mounted to the main body, an engaging member slidably assembled to the fixing bracket and positioned between the main body and the fixing bracket, and a resilient member connected between the fixing bracket and the engaging member; and
a supporting apparatus comprising a connecting bracket detachably mounted to the fixing bracket opposite to the engaging member, a supporting bracket mounted to the connecting bracket to support the main body;
wherein the fixing bracket defines a connecting hole therein, the connecting bracket comprises a first hook aligning with the connecting hole, the engaging member comprises a stop piece aligning with the connecting hole, and wherein when the engaging member is slid relative to the fixing bracket such that the stop piece moves away from the connecting hole, the first hook extends through the connecting hole, and after the engaging member is released to slide back under a force of the resilient member, the stop piece aligns with the connecting hole to engage with the first hook.

2. The electronic device of claim 1, wherein the main body defines a first recess in a rear side of the main body, the fixing bracket comprises a frame and a mounting panel extending down from a bottom side of the frame, the connecting hole is defined in the mounting panel, the frame is substantially box-shaped and comprises a first front wall, a first top wall extending rearward from a top side of the front wall, and a first bottom wall extending rearward from a bottom side of the first front wall, the first front wall, the first top wall, and the first bottom wall cooperatively bound a receiving space, the connecting bracket comprises a receiving portion received in the receiving space, the receiving portion comprises a second front wall, a second top wall extending rearward from a top side of the second front wall, and a second bottom wall extending rearward from a bottom of the second front wall, a fixing plate extends down from a rear side of the bottom wall, the first hook is L-shaped, and extends down from a bottom side of the fixing plate.

3. The electronic device of claim 2, wherein two latching holes are defined in a rear side of the first top wall, two protrusions protrude up from a rear side of the second top wall, the protrusions are latched in the latching holes.

4. The electronic device of claim 2, wherein two screw holes are defined in the mounting panel, the engaging member comprises a sliding panel, the stop piece extends up from a top of the sliding panel, two elongated guide holes are defined in the sliding panel, two screws slidably extend through the guide holes, to screw in corresponding ones of the screw holes, thereby slidably mounting the engaging member to the fixing bracket.

5. The electronic device of claim 2, wherein a substantially L-shaped fixing portion extends from the bottom of the mounting panel, the fixing portion comprises a supporting plate extending forward from the bottom of the mounting panel, and an extension plate extending down from a front side of the supporting plate, two tabs protrude up from the supporting plate, adjacent to the mounting panel, the tabs and the mounting panel cooperatively bound a slide slot, a bottom side of the engaging member is slidably received in the slide slot.

6. The electronic device of claim 5, wherein a second hook extends from an end of the mounting panel, a third hook extends from an end of the sliding panel, the resilient member is connected between the second and third hooks, opposite ends of the resilient member are respectively latched to the second and third hooks.

7. The electronic device of claim 2, wherein the supporting bracket is pivotably mounted to the connecting bracket.

8. The electronic device of claim 7, wherein a connecting portion extends from a first end of the supporting bracket, two pivoting plates extend from two opposite ends of the connecting portion, a first shaft hole is defined in each pivoting plate, two connecting plates extend up from two opposite ends of the second bottom wall, each connecting plate defines a second shaft hole therein, a shaft member pivotably extends through a corresponding first shaft hole and a corresponding second shaft hole.

9. The electronic device of claim 8, wherein the shaft member comprises a shaft pivotably extending through the first and second shaft holes, and a torsion spring fitting about the shaft, two ends of the torsion spring resist against the corresponding connecting plate and the connecting portion, respectively.

10. The electronic device of claim 2, wherein the supporting apparatus further comprises a cover fixed to the connecting bracket and an operation member, a second recess is defined in a lower portion of the front surface of the cover, an elongated guide hole is defined in the recess, the operation member comprises a sliding plate slidably received in the second recess and fixed to the engaging member, and an operation portion protruding rearward from the sliding plate, the operation portion extends through the guide hole, the operation portion is operable to move the engaging member to slide relative to the fixing bracket.

11. The electronic device of claim 10, wherein two sliding rails protrude out from two opposite sides of the sliding plate, two parallel slide slots are defined in the cover, respectively above and below the recess, the slide rails are slidably received in corresponding ones of the slide slots.

12. The electronic device of claim 11, wherein two columns protrude forward from the middle of the sliding plate away from the operation portion, a elongated through slot is defined in a lower portion of the mounting panel, two positioning holes are defined in the sliding panel of the engaging member, the columns extend through the through slot, to engage in the columns.

* * * * *